United States Patent Office 3,635,965
Patented Jan. 18, 1972

3,635,965
THIENO[2,3-d:4,5-d']DIPYRIMIDIN-4(3H)-ONES
Arthur A. Santilli, Havertown, and Dong H. Kim, Wayne, Pa., assignors to American Home Products Corporation, New York, N.Y.
No Drawing. Filed Nov. 4, 1969, Ser. No. 874,034
Int. Cl. C07d 99/06
U.S. Cl. 260—247.1                              4 Claims

ABSTRACT OF THE DISCLOSURE

This invention concerns thieno[2,3 - d:4,5 - d']dipyrimidin-4(3H)-ones which pharmacologically efficacious as central nervous system depressants.

---

This invention relates to new and novel tricyclic thienodipyrimidines. In particular, it concerns thieno[2,3-d:4,5-d']dipyrimidin-4-(3H)-ones which in standard and accepted biological tests exhibit pharmacological activity as central nervous system depressants.

The new and novel compounds within the scope of the present invention are exemplified by the following formula:

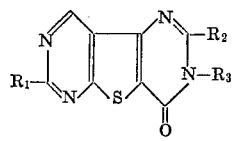

wherein $R_1$ is selected from the group consisting of lower alkyl, morpholino, phenyl, halophenyl, lower alkylphenyl and lower alkoxyphenyl; $R_2$ is selected from the group consisting of hydrogen and lower alkyl; and $R_3$ is selected from the group consisting of hydrogen, lower alkyl, lower alkoxy(lower)alkyl, morpholino(lower)alkyl and di(lower)alkylamino(lower)alkyl with the proviso that $R_3$ is hydrogen when $R_2$ is hydrogen. As employed herein the terms "lower alkyl," "lower alkoxy" and the like are meant to include both branched and straight chain moieties having from one to about six carbon atoms. Typical examples of the compounds of this invention are: 3-(2-methoxyethyl - 2 - methyl - 7 - phenylthieno[2,3-d:4,5-d']dipyrimidin-4(3H) - one; 7 - phenylthieno[2,3-d:4,5-d'] dipyrimidin-4(3H) - one– and 7 - morpholinothieno[2,3-d:4,5-d']dipyrimidin-4(3H)-one.

The new and novel 2-alkyl-3,7-disubstituted thieno[2,3-d:4,5-d']dipyrimidin - 4(3H) - ones (III) of the present invention are prepared by the process which is exemplified by the following reaction scheme:

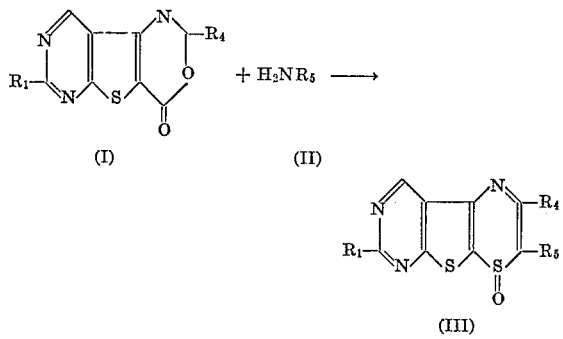

wherein $R_1$ is defined as above; $R_4$ is lower alkyl; and $R_5$ is lower alkyl, lower alkoxy(lower)alkyl, morpholino (lower)alkyl and di(lower)alkylamino(lower)alkyl. The reaction is effected by contacting a 2-alkyl-7-substituted-4H-pyrimido[5',4:4,5]thieno[3.2-d][1,3]oxazin - 4 - one (I) with an appropriate amine (II) at about the reflux temperature of the reaction mixture for a period of about five to thirty minutes.

When the reaction is complete, the resulting 2-alkyl-3,7-disubstituted thieno[2,3-d:4,5-d']dipyrimidin-4(3H) - one (III) is recovered by standard procedures. For example, the reaction mixture is cooled, filtered and the collected solid recrystallized from a suitable solvent e.g. dimethylformamide.

The new and novel 7-substituted thieno[2,3-d:4,5-d'] dipyrimidin-4(3H)-ones (VI) of the present invention are prepared by the reaction which is hereinafter schematically illustrated:

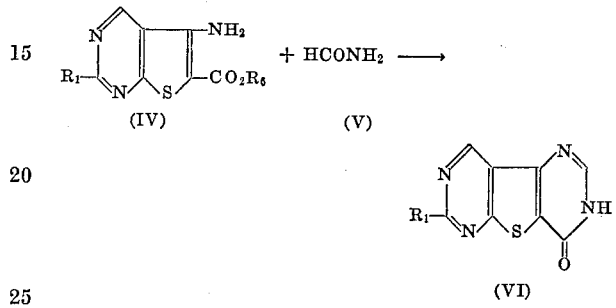

wherein $R_1$ is defined as above and $R_6$ is lower alkyl. The reaction is effected by contacting an appropriate 5-amino-2 - substituted thieno[2,3-d]pyrimidine - 6 - carboxylic acid, alkyl ester (IV) with formamide (V) at about the reflux temperature of the reaction mixture for a period of about one to about ten hours.

When the reaction is complete, the resulting 7-substituted thieno[2,3-d:4,5-d']dipyrimidin-4(3H)-one is separated by routine recovery techniques. For example, the reaction mixture is cooled, filtered and the collected solid recrystallized from an appropriate solvent, such as dimethylformamide and 2-ethoxyethanol.

The 2 - alkyl - 7 - substituted - 4H - pyrimido[5',4':4,5]thieno[3,2-d][1,3]oxazin - 4 - one (I) starting compounds employed in the first above-exemplified process are described and claimed in copending United States patent application, Ser. No. 874,050, entitled "2-Alkyl-7-Substituted - 4H - Pyrimido[5',4':4,5]Thieno[3,2-d][1,3]Oxazin-4-Ones" by Arthur A. Santilli and Dong H. Kim, filed in the U.S. Patent Office on the same day as the subject application. Therein, these starting compounds (I) are prepared by contacting a 5-amino-2-substituted thieno [2,3-d]pyrimidine-6-carboxanilide with a carboxylic acid anhydride at about reflux temperatures for a period of about one to about five hours. Alternatively, the 5-amino-2-substituted thieno[2,3-d]pyrimidine - 6 - carboxylic acid, alkyl ester (IV) starting compounds employed in the second above-exemplified process are described and claimed in copending United States patent application, Ser. No. 874,032, entitled "5-Amino-2-Substituted Thieno[2,3-d] Pyrimidine-6-Carboxylic Acid Derivatives" by Arthur A. Santilli and Dong H. Kim, filed in the U.S. Patent Office on the same day as the subject application. Therein, these starting compounds (IV) are prepared by the reaction of 4-chloro-2-substituted-5-pyrimidine carbonitrile with an alkyl mercaptoacetate in the presence of a base.

The new and novel thieno[2,3-d:4,5-d']dipyrimidin-4 (3H)-ones (III and VI) of the present invention possess valuable pharmacological activity. In particular, these compounds in standard pharmacological procedures demonstrate nervous system activity and are useful as depressants. Because of this property they are particularly useful in producing a calming effect in animals.

In the pharmacological evaluation of the central nervous system depressant compounds of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increases spontaneous motor activity, hyperactivity on tactile stimulation, twitching), general depression (i.e., decreased spontaneous motor activity, decreased respiration) and automatic activity (i.e., miosis, mydriasis, diarrhea) are noted. The animals are tested for changes in reflexes (i.e. flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce decreased motor activity at a dose range of 12.7 mg./kg. to 40 mg./kg. There were no deaths in the test animals at the highest dose used, 400 mg./kg., intraperitoneally.

When the compounds of this invention are employed as central nervous system depressants they may be administered to warm-blooded animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk, sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration.

EXAMPLE I

Two grams of 2-methyl-7-phenyl-4H-pyrimido[5',4':4,5]thieno[3,2-d][1,3]oxazin-4-one is added to 15 ml. of 2-methoxyethylamine and the mixture heated under reflux for five minutes, during which time a precipitate forms. The reaction mixture is cooled in ice, filtered and the precipitate recrystallized from dimethylformamide giving 3-(2-methoxyethyl) - 2 - methyl-7-phenylthieno-[2,3-d:4,5-d']dipyrimidin-4(3H)-one, M.P. 246–248° C.

*Analysis.*—Calcd. for $C_{18}H_{16}N_4O_2S$ (percent): C, 61.35; H, 4.58; N, 15.90; S, 9.10. Found (percent): C, 61.05; H, 4.65; N, 15.96; S, 9.46.

In a similar manner, 2-methyl-7-(p-tolyl)-4H-pyrimido[5',4':4,5]thieno[3,2-d][1,3]oxazin-4-one is reacted with 3 - ethoxypropylamine to afford 3-(3-ethoxypropyl)-2-methyl - 7 - (p-tolyl)thieno[2,3-d:4,5-d']dipyrimidin-4(3H)-one.

EXAMPLE II

Four grams of 7-(p-chlorophenyl) - 2 - methyl-4H-pyrimido[5',4':4,5]thieno[3,2-d][1,3]oxazin - 4 - one is added to 30 ml. of ethylamine and the mixture heated in an autoclave at 150° C. for fifteen minutes. Thereafter, the reaction mixture is cooled in ice, filtered and the solid recrystallized from dimethylformamide to yield 7-(p-chlorophenyl) - 3 - ethyl - 2 - methylthieno[2,3-d:4,5-d']dipyrimidin-4(3H)-one.

In like manner, the following compounds are prepared:

7-(m-bromophenyl)-2,3-dimethylthieno[2,3-d:4,5-d']dipyrimidin-4(3H)-one;
7-(p-iodophenyl)-2-methyl-3-propylthieno[2,3-d:4,5-d']
7-(p-iodophenyl)-2-methyl-3-propylthieno[2,3-d:4,5-d']dipyrimidin-4(3H)-one; and
3-butyl-7-(p-fluorophenyl)-2-methylthieno[2,3-d:4,5-d']dipyrimidin-4(3H)-one.

EXAMPLE III

Six grams of 2-ethyl - 7 - morpholino-4H-pyrimido[5',4':4,5]thieno[3,2-d][1,3]oxazin - 4 - one is added to 45 ml. of dimethylaminoethylamine and the mixture heated under reflux for thirty minutes. Thereafter, the reaction mixture is cooled in ice, filtered and the solid recrystallized from formamide to yield 2-ethyl-3-(2-dimethylaminoethyl) - 7 - morpholinothieno[2,3-d:4,5-d']dipyrimidin-4(3H)-one.

In a similar manner, 7-(p-methoxyphenyl)-2-propyl-4H-pyrimido[5',4':4,5]thieno[3,2-d][1,3]oxazin-4-one is reacted with diethylaminoethylamine to yield 3-(2-diethylaminoethyl)-7-(p-methoxyphenyl) - 2 - propylthieno[2,3-d:4,5-d']dipyrimidin-4(3H)-one.

EXAMPLE IV

Repeating the procedure of Examples I–III to react a 2 - alkyl - 7 - substitute - 4H - pyrimido[5',4':4,5]thieno[3,2-d][1,3]oxazin-4-one with an appropriate amine, the following compounds are obtained:

2,7-dimethyl-3-(2-morpholinoethyl)thieno[2,3-d:4,5-d']dipyrimidin-4(3H)-one;
3-(4-ethoxybutyl)-7-ethyl-2-methylthieno[2,3-d:4,5-d']dipyrimidin-4(3H)-one;
2-methyl-3-(4-morpholinobutyl)-7-(p-propoxyphenyl)thione[2,3-d:4,5-d']dipyrimidin-4(3H)-one;
7-butyl-3-(4-dimethylaminobutyl)-2-methylthieno[2,3-d:4,5-d']dipyrimidin-4(3H)-one;
7-(p-ethylphenyl)-2-methyl-3-(3-dipropylaminopropyl)thieno[2,3-d:4,5-d']dipyrimidin-4(3H)-one; and
7-(m-ethoxyphenyl)-2,3-dimethylthieno[2,3-d:4,5-d']diipyrmidin-4(3H)-one.

EXAMPLE V

To 10 ml. of formamide there is added 1.0 g. of 5-amino-2-phenylthieno[2,3-d]pyrimidine - 6 - carboxylic acid, ethyl ester. The reaction mixture is heated under reflux for one and a half hours and then cooled in ice. The yellow crystalline product is recrystallized from 2-ethoxyethanol affording 0.2 g. of 7-phenylthieno[2,3-d:4.5-d']dipyrimidin-4(3H)-one, M.P. >360° C.

*Analysis.*—Calcd. for $C_{14}H_8N_4OS$ (percent): C, 59.99; H, 2.88; N, 19.99; S 11,.44. Found (percent): C, 59.90; H, 2.84; N, 19.76; S, 11.22.

Similarly, 7 - (p-chlorophenyl)thione[2,3-d:4,5-d']dipyrimidin-4(3H)-one and 7-(p-tolyl)thione[2,3-d:4,5-d']dipyrimidin-4(3H)-one are synthesized.

EXAMPLE VI

To 100 ml. of formamide, there is added 6.5 g. of 5-amino-2-morpholinothieno[2,3-d]pyrimidine - 6 - carboxylic acid, ethyl ester. The mixture is heated under reflux for ten hours and cooled in ice. The crystalline product which forms is collected and recrystallized from dimethylformamide to yield 7-morpholinothieno[2,3-d:4,5-d']dipyrimidin-4(3H)-one (2.1 g.), M.P. >350° C.

*Analysis.*—Calcd. for $C_{12}H_{11}N_5O_2S$ (percent): C, 49.82; H, 3.83; N, 24.21; S, 11.08. Found (percent): C, 49.68; H, 4.09; N, 23.89; S, 10.72.

In like manner, 7-methylthieno[2,3-d:4,5-d']dipyrimidine-4(3H)-one and 7-(p-methoxyphenyl)thieno[2,3-d:4,5-d']dipyrimidin-4(3H)-one are prepared.

What is claimed is:

1. A compound selected from the group consisting of those having the formula:

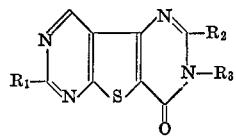

wherein $R_1$ is selected from the group consisting of lower alkyl, morpholino, phenyl, halophenyl, lower alkylphenyl and lower alkoxyphenyl; $R_2$ selected from the group consisting of hydrogen and lower alkyl; and $R_3$ is selected from the group consisting of hydrogen, lower alkyl, lower alkoxy(lower)alkyl, morpholino(lower)alkyl and di(lower)alkylamino(lower)alkyl with the proviso that $R_3$ is hydrogen when $R_2$ is hydrogen.

2. A compound as described in claim 1 which is: 3-(2-methoxyethyl) - 2 - methyl-7-phenylthieno[2,3-d:4,5-d']dipyrimidin-4(3H)-one.

3. A compound as described in claim 1 which is: 7-phenylthieno[2,3-d:4,5-d']dipyrimidin-4(3H)-one.

4. A compound as described in claim 1 which is: 7-morpholinothieno[2,3-d:4,5-d']dipyrimidin-4(3H)-one.

References Cited
UNITED STATES PATENTS 3,318,883   5/1967   Ohnacker et al. ___ 260—256.5 R ALEX MAZEL, Primary Examiner R. J. GALLAGHER, Assistant Examiner U.S. Cl. X.R.

260—244 R, 256.5 R; 424—251

PO-1050
(5/69)

UNITED STATES PATENT OFFICE
CERTIFICATE OF CORRECTION

Patent No. 3,635,965          Dated June 2, 1972

Inventor(s) Arthur A. Santilli and Dong H. Kim

It is certified that error appears in the above-identified patent and that said Letters Patent are hereby corrected as shown below:

Column 1, line 55, structural formula (I) should be as shown below:

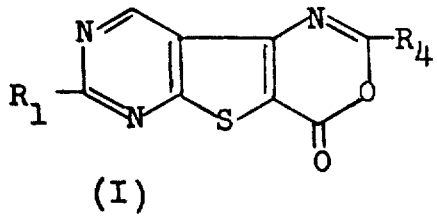

(I)

Column 1, line 65, structural formula (III) should be as shown below:

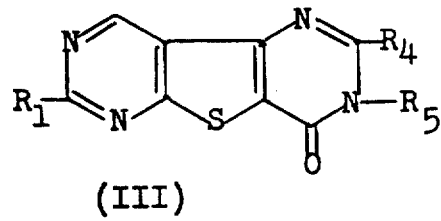

(III)

Column 4, line 8, delete "7-(p-iodophenyl)-2-methyl-3-propyl-thieno[2,3-d:4,5-d']".

Column 4, line 47 (last line of Example IV), change "diipyrimdin" to --dipyrimidin--.

Column 4, in each of lines 61 and 62, change "thione" to --thieno--.

Signed and sealed this 12th day of September 1972.

(SEAL)
Attest:

EDWARD M. FLETCHER, JR.
Attesting Officer

ROBERT GOTTSCHALK
Commissioner of Patents